Aug. 5, 1969  G. HOHWART  3,459,433

REPLACEABLE JAW INSERTS

Filed March 2, 1966  3 Sheets-Sheet 1

INVENTOR
George Hohwart
BY
Harness, Dickey & Pierce
ATTORNEYS.

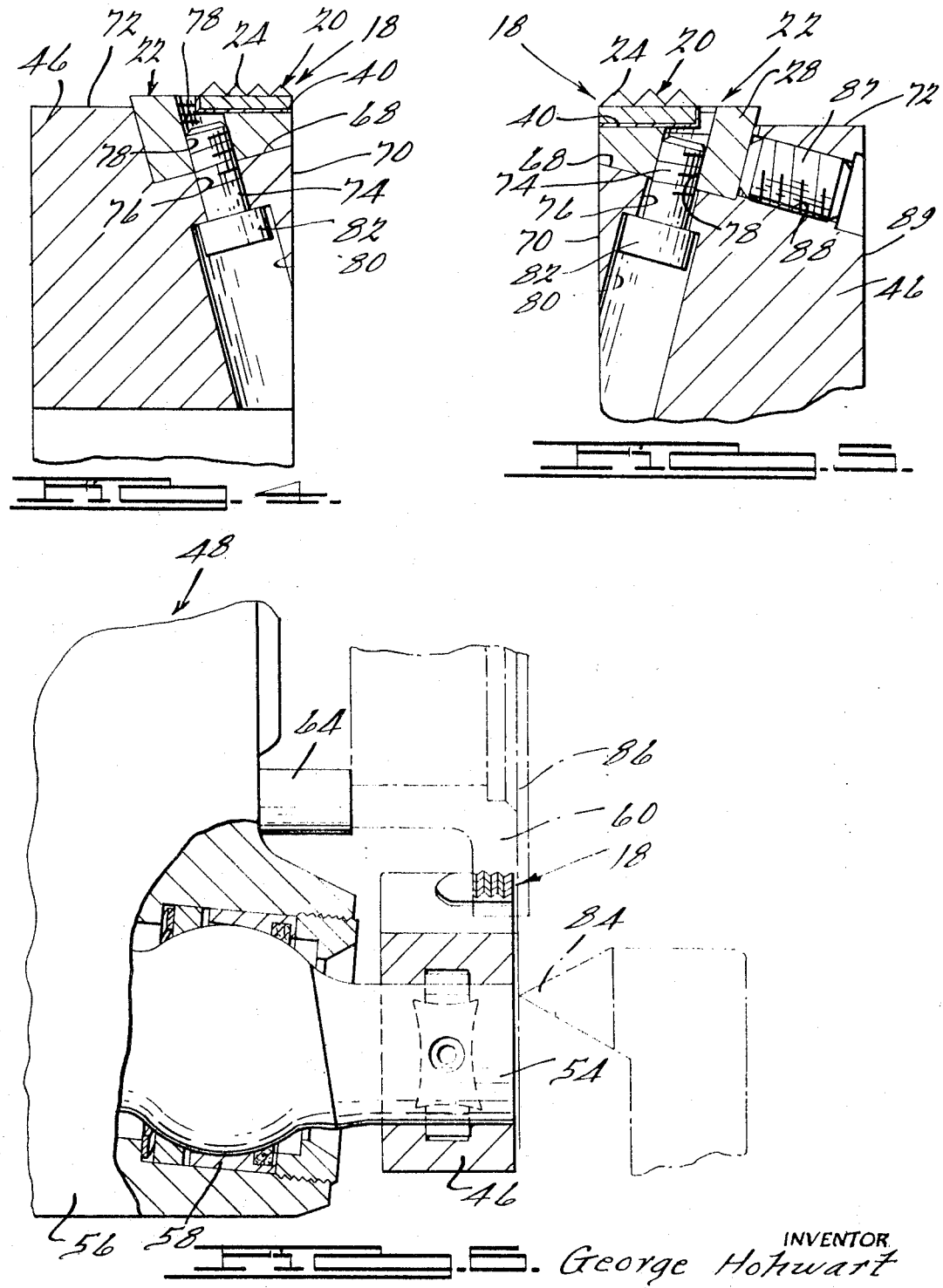

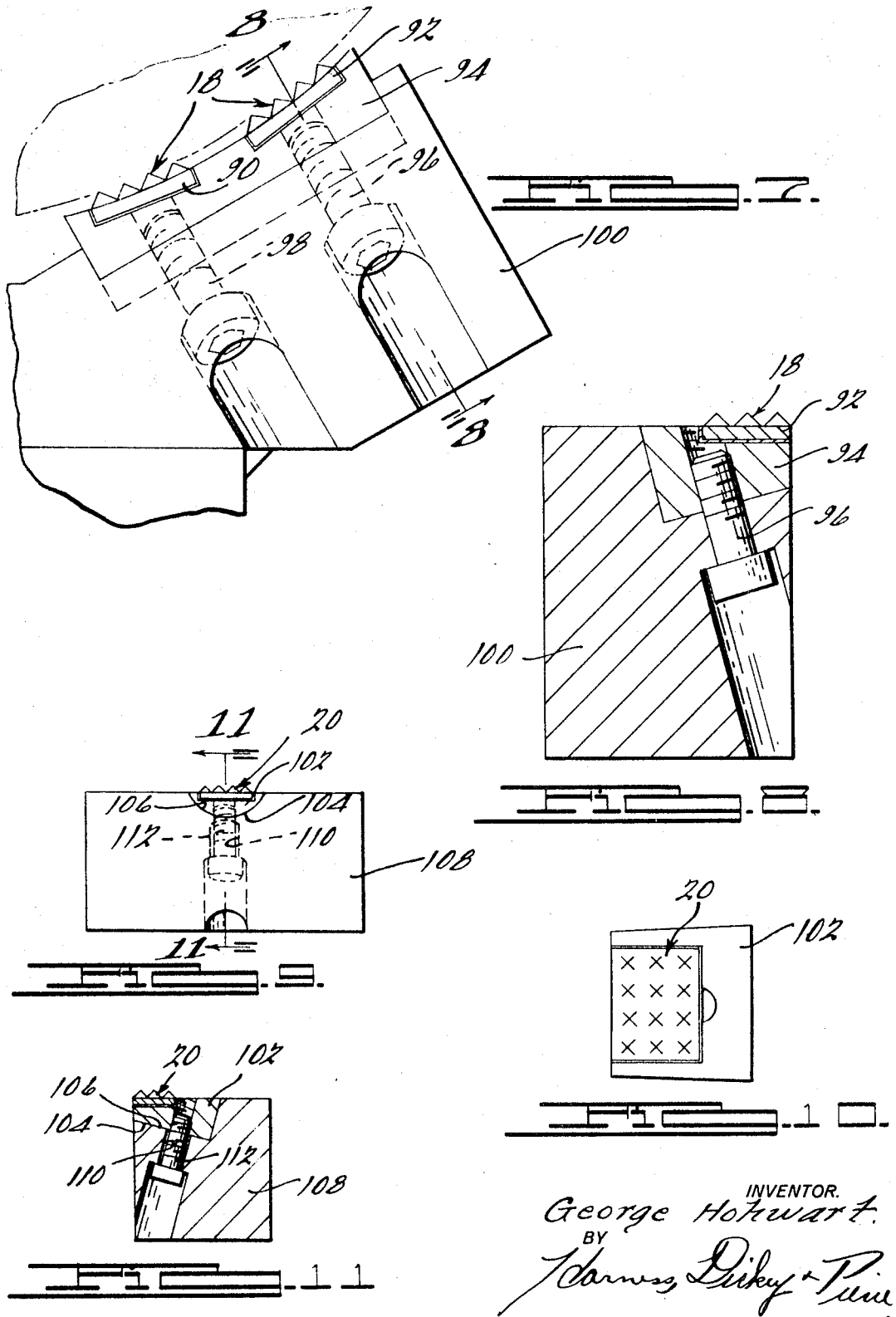

United States Patent Office 3,459,433
Patented Aug. 5, 1969

3,459,433
REPLACEABLE JAW INSERTS
George Hohwart, Farmington, Mich., assignor to N. A. Woodworth Company, Ferndale, Mich., a corporation of Michigan
Filed Mar. 2, 1966, Ser. No. 531,126
Int. Cl. B23b 31/10, 31/00
U.S. Cl. 279—123
10 Claims

ABSTRACT OF THE DISCLOSURE

A chuck jaw having replaceable work engaging and holding inserts which are uniquely formed and coactive with the body of the jaw so that clamping pressure and pull-back action applied to the jaw in the operation of the chuck does not tend to loosen the inserts in the jaw.

---

This invention relates to new and useful improvements in replaceable jaw inserts or grips for the work holding jaws of power chucks and the like.

The work clamping jaws of power chucks conventionally are equipped with tungsten carbide grips which engage and hold the work, and it has been suggested heretofore that these grips be replaceable so that they can be discarded when worn or broken without involving expensive parts of the chuck or affecting the setting or adjustment of the chuck. The carbide grips usually are soldered to backing members and the latter are detachably fastened to the chuck jaws by screws or the like.

The mounting conventionally used for the grips is defective, however, in several respects. For one thing, the backing members hold and position the grips in such a way that the latter engage the workpiece a substantial distance from the outer faces of the jaws thus making it impossible to clamp a relatively thin part of the workpiece, such as the flange of a brake drum for example, for a face cutting or similar machining operation. Also, when conventional replaceable grips are used on a chuck of the type which first clamps the workpiece and then pulls it back against end stops, the pull-back action tends to move the grips relative to the chuck jaws and sometimes bends or even breaks the fastening screws. There is a need, therefore, for an improved mounting for these replaceable grip elements which overcomes the above deficiencies.

An important object of the present invention is the provision of a replaceable grip of the above-mentioned character that is uniquely constructed and mounted on the chuck jaw to obviate the deficiencies of the prior art devices.

Other objects and advantages of the construction will be apparent in the course of the following description.

Figure 1:
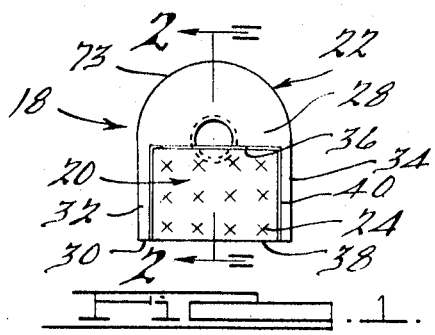
Figure 2:
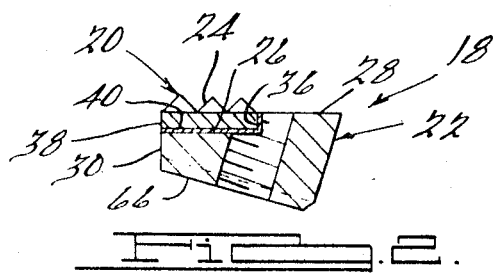
Figure 3:
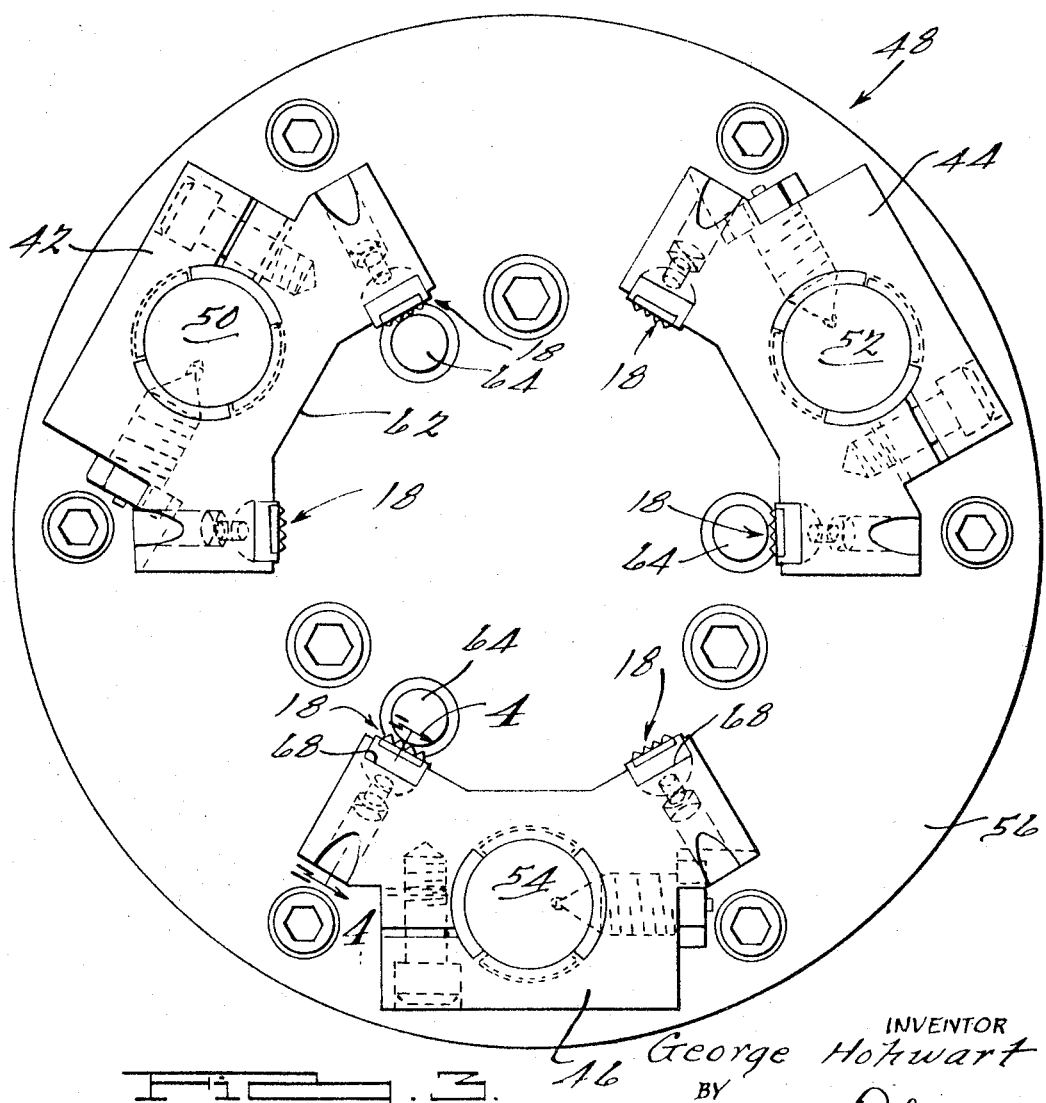

In the drawings, forming a part of this specification, and wherein like numerals are employed to designate like parts, FIGURE 1 is a top plan view of a grip assembly embodying the invention and consisting of a carbide grip element and a backing member therefor, FIGURE 2 is a longitudinal sectional view taken on the line 2—2 of FIGURE 1, FIGURE 3 is a plan view of a power chuck having work holding jaws equipped with grips of the type shown in FIGURES 1 and 2, FIGURE 4 is an enlarged sectional view through the chuck jaw and grip assembly taken on the line 4—4 of FIGURE 3, FIGURE 5 is a view similar to FIGURE 4 but showing a modified mounting for the grip assembly, FIGURE 6 is a side elevational view of the chuck illustrating the manner in which the grip engages a workpiece in the chuck, parts of the chuck being broken away and shown in section for clearness of illustration, FIGURE 7 is a fragmentary face or plan view of the chuck showing a modified body and grip mounting arrangement, FIGURE 8 is a transverse sectional view taken on the line 8—8 of FIGURE 7, FIGURE 9 is a plan view of a chuck jaw equipped with a modified grip and grip mounting arrangement, FIGURE 10 is a plan view of the modified grip assembly shown in FIGURE 9, and FIGURE 11 is a transverse sectional view taken on the line 11—11 of FIGURE 9.

For a detailed description of the invention, reference is first had to the jaw insert or grip assembly 18 shown in FIGURES 1 and 2 which, as suggested, comprises a grip element 20 and a backing member 22 for the grip element. The latter preferably and conventionally is made of tungsten carbide and is here shown in the form of a thin rectangular wafer having a plurality of pyramidal projections or work gripping teeth 24 on one side thereof. Tungsten carbide cannot be readily drilled and tapped to provide means for mounting the grip element 20, in a chuck jaw, and accordingly it is set into a suitable steel backing member 22 that can be drilled and tapped for mounting in and fastening to the chuck jaw. In the form of the invention shown here by way of illustration, the backing member 22 is slightly larger in its plan dimensions than the grip element 20 and it is formed with a socket or a recess 26 which opens through the outer face 28 and which accommodates and fits the grip element relatively snugly. This arrangement leaves upstanding flanges 32 and 34 at opposite sides of the recess 26 and along the seating side edges of the backing member 22, which flanges extend along or overlap the side edges of the grip element 20 to restrain and confine the latter, and the rear side 36 of the recess 26 engages the grip 20 at the rear to hold the exposed front edge 38 thereof flush with the exposed inner edge 30 of the backing member 22. The grip 20 is silver soldered as at 40 or otherwise permanently bonded and joined to the backing member 22 and the silver solder bonding agent preferably covers the bottom of the grip 20 and the three confined or seating edges thereof as shown in the drawing. The top surface of the grip 20 at the base of the teeth 24 is here shown flush with the backing member 22. However, this relationship is not critical, it being merely necessary that the recess 26 be sufficiently deep to provide restraining edges for the three confined sides of the gripping element 20. Also it is essential that the upstanding teeth 24 project above the backing member 22 for proper engagement with a workpiece in use.

As perhaps best shown in FIG. 3, the grip assembly 18 is here shown mounted on the work clamping jaws 42, 44 and 46 of a power chuck 48 of the type shown in the U.S. Patent No. 3,099,457, which issued to Hohwart et al., July 30, 1963. In this form of power chuck, the jaws 42, 44 and 46 are mounted on rocker arms 50, 52 and 54 respectively which are supported in the chuck body 56 on swivel mountings 58 (FIG. 6). Only one such mounting 58 is shown but it will be understood that all of the rocker arms are similarly mounted. Suitable means, not shown but described in detail in the issued patent referred to above, are provided for rocking the arms 50, 52 and 54 simultaneously in the swivel mounting 58 to move the jaws 42, 44 and 46 radially into and out of engagement with a workpiece. In the drawing, a workpiece 60 is shown in the chuck and engaged by one of the work clamping jaws 46. In every instance the jaws 42, 44 and 46 are formed to accommodate a particular workpiece, and the shape of the jaws therefor vary depending on the size and form of the work involved. The jaws here shown by way of illustration are formed with concave inner edges 62 and each jaw is equipped with two laterally spaced grip assemblies 18. Thus, the three jaws 42, 44 and 46 engage the workpiece 60 at six substantially equispaced points and consequently distribute the clamping pressure among the six points or areas of contact to minimize and preferably to prevent distortion of the workpiece under clamping conditions. As best shown in FIGURE 3, the grip assemblies 18 face radially inwardly toward the center of the chuck and as shown in FIGURE 6, they are disposed inwardly of the points about which the rocker arms 50, 52 and 54 turn in the swivel mountings 58 so that the grips swing inwardly and rearwardly to engage the workpiece 60. As a result, the workpiece 60 is first clamped by the jaws 42, 44 and 46 and, as the chuck thereafter applies full clamping pressure, the workpiece is pulled back against end stops 64 provided in the face of the chuck body 56. Chucks of the type here under consideration develop tremendous clamping pressure and the pull-back action thus exerted on the workpiece 60 after the latter has been clamped by the jaws 42, 44 and 46 imposes strain on the grip assemblies. Also forces resulting from machining and other operations performed on the chucked workpiece greatly strain the grip assemblies and the fastening screws that hold the assemblies attached to the jaws.

It is a feature of the present invention that the grip assemblies 18 are uniquely mounted in the jaws of the chuck to resist and counteract the destructive forces created by the conditions referred to above. To this end the backing member 22 is generally wedge shaped in side elevation, as shown in FIGURE 2 and the inner or bottom side 66 thereof is disposed in acute angular relation with respect to the outer or face side 28 and tapered toward the open side of the recess 26. An included angle of approximately 15 degrees between the outer and inner sides 28 and 66 of the backing member 22 has been found satisfactory.

Each grip assembly 18 fits into a socket 68 in the jaw in which it is mounted. An enlarged view of one of the grip assemblies carried by the jaw 46 is shown in FIGURE 4. As shown, the socket 68 opens through the outer, or front or face side 70 and the inner edge 72 of the jaw 46. Further, the bottom of the socket 68 extends into the jaw downwardly and inwardly (toward the center of the chuck) from the outer face 70 and the included angle between the bottom and the edge 72 preferably is the same as the taper angle of the grip backing member 22 so that the outer face of the grip 20 is parallel to the edge 72. The socket 68 shown is slightly shallower than the thickness dimension of the backing member 22 so that the latter projects slightly beyond the inner side 72 of the jaw.

The sockets 68 in the jaws 42, 44 and 46 can best be formed by running an end milling cutter into the jaw, and this method of forming the socket, of course, leaves the latter with an arcuate inner end. Therefore the backing member 22 is correspondingly shaped with an arcuate inner end 73 so that it conforms to and snugly fits the socket 68.

Fastening screws 74 extend through openings 76 in the jaws 42, 44 and 46 and into tapped holes 78 in the backing members 22 of the grip assemblies 18 to fasten the latter securely but detachably to the jaws. Also, it is a feature of the invention that the holes 76 and 78 extend normally or at right angles to the bottoms of the sockets 68, and the outer portions of the holes 78 preferably are counterbored as at 80 to accommodate the heads 82 of the screws 74. This particular relationship between the sockets 68 and the holes 76 and 78 cause the latter to open through the outer or face sides 70 of the jaws a short distance from the grip assemblies 18 and also makes the heads 82 of the screws 74 readily accessible to a wrench for replacement of the grip assemblies.

The tapered form of the grip assemblies and the disposition of the sockets 68 so that they undercut the outer, front or face sides 70 of the chuck jaws 42, 44 and 46 position the grips 20 for proper engagement with the workpiece 60 and overcome any tendency for the grip assemblies to overstress or damage the fastening screws 74 under clamping pressure or as the result of pull-back action developed during the clamping operation. In fact, when the grip assemblies 18 are mounted in the manner described, they remain solidly in place even though the fastening screws 74 are removed and there is no tendency for the grip assemblies to slide or move relative to the jaws under clamping conditions. Thus, the only function actually served by the screws 74 is to hold the grip assemblies 18 on the jaws when the workpiece 60 is removed.

The grip assembly and jaw mounting arrangement hereinabove described is more versatile in use than the grips heretofore used and a typical example of its special utility is illustrated in FIGURE 6 which shows the manner in which the chuck receives and in which the chuck jaws engage a thin outwardly extending peripheral flange on the workpiece 60 for a facing operation on one end of the work. This is a kind of machining operation frequently encountered and, therefore, one with which chucks of the type here under consideration frequently are involved. In the particular machining operation described, the gripper elements on the jaws must engage and hold the work securely so that a cutting tool 84 can move across the face of the work along the line 86 and cut or trim away the portion thereof outwardly or to the right of the line as viewed in the drawing. It is desirable that the gripper elements engage the work as close as possible to the line of cut if it is required to clamp onto an essentially thin part of the workpiece as, for example, the peripheral flange shown in the drawing. Manifestly, if the gripper elements are at the middle of the jaws 42, 44 and 46 or at any location remote from the outer sides of the jaws, they either will not engage a sufficient area of the workpiece to assure a secure grip on it or they will hold the workpiece so far back in the chuck as to make the above described machining operation impossible to perform. Thus, the concept of positioning the gripper elements 20 flush with the edges 30 of the backing members 22 and of mounting the gripper assemblies 18 with the edges 30 of the backing members flush or substantially flush with the outer sides or faces 70 of the jaws 46 is critical and essential in achieving the mode of operation and beneficial results referred to.

FIGURE 5 shows a modified mounting for the grip assembly which is similar to the one previously described except that a set screw 87 is provided in the jaw 46 at the inner end of the grip assembly 18. As shown, the set screw 87 is mounted in a tapped hole 88 which extends into the jaw from the inner or bottom side 89 thereof and into the socket 68. The hole 88 extends parallel to the bottom of the socket 68 and the inner end of the set screw 87 bears on the corresponding end of the backing member 22. Thus, as the set screw 87 is advanced or retracted, it permits or causes the grip assembly 18 to slide on the tapered bottom surface of the socket 68 and thus adjusts the group assembly on the jaw and radially relative to the rotational axis of the chuck. When the adjustment set screw 87 is used, the hole 76 for the fastening screw 74, of course, is made sufficiently oversize as shown in the drawing to accommodate the range of adjustment described for the grip assembly. As a result, the gripping elements 20 can be individually adjusted on the chuck jaws to compensate for manfacturing tolerances or slight misalignment of parts at assembly so that all of the grips can be accurately positioned precisely concentrically to the chuck axis. Thus, the work can be centered exactly in the chuck and equal clamping pressure is assured at all of the grips.

FIGURES 7 and 8 show a modified construction in which two gripper assemblies 90 and 92 are mounted on a single backing member 94 and two screws 96 and 98 are employed to hold the relatively elongate backing member attached to the jaw 100. As shown in FIGURE 8, both of the gripper elements 90 and 92 are mounted on and associated with the backing member 94 in the same manner as in the form of the invention first described. From the foregoing, it will be rapidly apparent that the backing member can be equipped with any desired number of gripper elements or gripper assemblies and that any number of fastening screws required to hold the backing member properly attached to the jaw can be used.

Reference is now had to FIGURES 9–11 which show the gripper element 20 mounted in a modified backing member 102 having an arcuate or semi-cylindrical longitudinal back surface or bottom 104 instead of the flat back surface of the backing member first described. Also, in this form of the invention, the socket 106 which receives the gripper assembly is of corresponding cylindrical form to receive and snugly fit the backing member 102. In this instance, the socket 106 can be made most easily by means of an end mill, and when the socket is formed in this manner, the inner end thereof is flat and transverse to its longitudinal axis. The inner end of the backing member 102 therefor preferably is correspondingly shaped. However, except for the above features, the gripper assembly and the mounting is identical to the first form of the invention. Thus, the gripper element is mounted flush with the outer edge or end of the backing member 102 and the socket 106 extends into the jaw 108 at an acute angle with respect to the outer or face side of the jaw. The backing member 102 also is tapered longitudinally at the same angle as the socket 106 so as to position the gripper element essentially parallel to the inner edge of the jaw 108 for proper engagement with the workpiece.

The modified form and mounting for the backing member 102 has the advantage that the socket 106 is easier to machine into the jaw particularly if the latter is of complicated or intricate form or if some part of the jaw is disposed so as to interfere with the cutter which machines it. Also, the modified mounting permits the backing member to turn or adjust at least slightly on the arcuate seat provided by the socket 106 as required to engage the gripper element flatly and solidly on the workpiece. Adjustable grippers are not necessary in the case of a smoothly finished workpiece; however, the adjustable mounting may be necessary or desirable if the workpiece is not finished. If no adjustment is provided, all of the gripping teeth of the elements may not engage the work and clamping pressure will be concentrated on only a few of the teeth. This may cause the chuck to have an insecure grip on the work and it may overstress the gripping elements causing them to break or chip. On the other hand, the adjustment feature permits each gripping element to move as required, to engage all of the gripping teeth against the work in the event one side of the element seats on a high spot. In this arrangement, however, it is necessary that the hole 110 in the jaw 108 which accommodates the fastening screw 112 be sufficiently oversize to permit angular movement or adjustment of the gripper assembly and, in this type of mounting, the fastening screws 112 preferably are kept sufficiently loose to permit the adjustment to occur. As suggested, the undercut mounting of the gripper elements holds the latter securely associated with the jaws and resists the pull-back action of the chuck; and the only purpose actually served by the fastening screws 112 is to prevent the gripping elements from falling away from the jaw 108 when the workpiece is removed.

Having thus described the invention, I claim:

1. Work engaging and holding means for power chucks and the like comprising
 a carbide grip having an exposed edge and other seating edges,
 a backing member for said grip supporting the entire rear or bottom surface of the latter and having a confining flange portion extending along and at least partially overlapping the seating edges of said grip, the front surface of said grip and the rear surface of said backing member being disposed in acute angular relation to each other and tapering toward said exposed edge of the grip, and
 a chuck jaw having an outer face and an adjacent edge supporting surface, said backing member being seated against the inner edge supporting surface of said jaw and the inner edge supporting surface of said jaw being under cut with respect to said outer face to dispose said grip substantially at right angles to said outer face of the jaw.

2. The combination as set forth in claim 1 including screw means extending angularly inwardly from the outer face of said jaw and threadedly connected to said backing member to hold the latter fastened securely to but detachable from said jaw.

3. The combination as set forth in claim 1 wherein both said backing member and said grip are disposed substantially flush with the outer face of said jaw.

4. The combination as set forth in claim 1 wherein said backing member fits snugly into a socket in the jaw, which socket opens through said outer face and said inner edge supporting surface of said jaw, and wherein the mating surfaces of said socket and said backing member are arcuate in form to permit said grip to adjust under clamping pressure to the surface of a workpiece engaged thereby.

5. The combination as set forth in claim 4 including screw means extending angularly inwardly from the outer face of said jaw and threadedly connected to said backing member to hold the latter fastened securely to but detachable from said jaw, and wherein the portion of said screw means extending from said backing member is accepted in a hole provided in said jaw and wherein said hole is sufficiently oversize to permit limited angular adjustment of said screw and said backing member under clamping pressure exerted against said grip.

6. Work engaging and holding means for power chucks and the like comprising
 a carbide grip having an exposed edge and other seating edges, a backing member for said grip supporting the entire rear or bottom surface of the latter and having a confining flange portion extending along and at least partially overlapping the seating edges of said grip, the front surface of said grip and the rear surface of said backing member being disposed in acute angular relation to each other and tapering toward said exposed edge of the grip,
 a chuck jaw having a socket opening through the outer face and inner edge thereof, and wherein the bottom of the socket is disposed at a taper angle which undercuts the outer face of the jaw, the taper angles of said socket and the rear surface of said backing member being substantially the same to position said grip essentially parallel with the inner edge of the jaw, and
 means for slidably adjusting said backing member on the bottom of said socket to move said grip normally relative to the inner edge of said jaw and radially in the chuck.

7. Work engaging and holding means for power chucks and the like comprising
 a carbide grip having an exposed edge and other seating edges,
 a backing member for said grip supporting the entire rear or bottom surface of the latter and having a confining flange portion extending along and at least partially overlapping the seating edges of said grip, the front surface of said grip and the rear surface of said backing member being disposed in acute angular relation to each other and tapering toward said exposed edge of the grip,
 a chuck jaw having a socket opening through the outer face and inner edge thereof, and wherein the bottom of the socket is disposed at a taper angle which undercuts the outer face of the jaw, the taper angles of said socket and the rear surface of said backing member being substantially the same to position said grip essentially parallel with the inner edge of the jaw, means for slidably adjusting said backing member on the bottom of said socket to move said grip normally relative to the inner edge of said jaw and radially in the chuck, and means for holding said backing member attached to said jaw in the selected adjusted position.

8. Work engaging and holding means for power chucks and the like comprising a carbide grip having an exposed edge and other seating edges, a backing member for said grip supporting the entire rear or bottom surface of the latter and having a confining flange portion extending along and at least partially overlapping the seating edges of said grip, the front surface of said grip and the rear surface of said backing member being disposed in acute angular relation to each other and tapering toward said exposed edge of the grip, a chuck jaw having a socket opening through the outer face and inner edge thereof, and wherein the bottom of the socket is disposed at a taper angle which undercuts the outer side of the jaw, the taper angles of said socket and the rear surface of said backing member being substantially the same to position said grip essentially parallel with the inner edge of the jaw, and an adjusting screw in said jaw accessible for adjustment from the inner face of the jaw and bearing endwise on said backing member, said adjusting screw being operative to adjust said backing member selectively on the bottom of said socket to move said grip normally relative to the inner edge of said jaw and radially in said chuck.

9. Work engaging and holding means for power chucks and the like comprising a carbide grip having an exposed edge and other seating edges, a backing member for said grip supporting the entire rear or bottom surface of the latter and having a confining flange portion extending along and at least partially overlapping the seating edges of said grip, the front surface of said grip and the rear surface of said backing member being disposed in acute angular relation to each other and tapering toward said exposed edge of the grip, a chuck jaw having a socket opening through the outer face and inner edge thereof, and wherein the bottom of the socket is disposed at a taper angle which undercuts the outer face of the jaw, the taper angles of said socket and the rear surface of said backing member being substantially the same to position said grip essentially parallel with the inner edge of the jaw, an adjusting screw in said jaw accessible for adjustment from the inner face of the jaw and bearing endwise on said backing member, said adjusting screw being operative to adjust said backing member selectively on the bottom of said socket to move said grip normally relative to the inner edge of said jaw and radially in said chuck, and fastening screw means threaded into said backing member and extending substantially at right angles to and into the backing member through an oversize hole in said jaw, said oversized hole opening through the outer face of said jaw adjacent to said socket.

10. A replaceable insert for work clamping and holding jaws adapted for use with power chucks and the like comprising a carbide grip having an exposed edge and other seating edges, and a backing member for said grip supporting the entire bottom surface of the latter and having a confining flange portion extending along and at least partially overlapping the seating edges of said grip, the top surface of said grip and the bottom surface of said backing member being disposed in acute angular relation to each other and tapering toward said exposed edge of the grip, said backing member having a convexly curved seating edge remote from the exposed edge of said grip and provided in the bottom surface thereof with a tapped hole for receiving a fastening screw.

References Cited

UNITED STATES PATENTS

| Re. 4,917 | 5/1872 | Herbert | 81—423 |
| 1,898,264 | 2/1933 | Proefke | 279—46 |
| 2,374,192 | 4/1945 | Godfrey | 279—51 |
| 3,041,079 | 6/1962 | Garrison et al. | 279—123 |
| 3,090,614 | 5/1963 | Freeman et al. | |

FOREIGN PATENTS

| 627,395 | 8/1949 | Great Britain. |
| 402,780 | 3/1943 | Italy. |

LESTER M. SWINGLE, Primary Examiner

JAMES F. McKEOWN, Assistant Examiner

U.S. Cl. X.R.

269—282